United States Patent [19]

English et al.

[11] Patent Number: 4,500,876
[45] Date of Patent: Feb. 19, 1985

[54] CONTROL SYSTEM FOR POSITIONING A MARKER ON A CATHODE-RAY TUBE DISPLAY

[75] Inventors: Brian B. English, Edinburgh; Hamish W. M. Gray, Lothian, both of Scotland

[73] Assignee: Ferranti plc, Cheadle, England

[21] Appl. No.: 359,310

[22] Filed: Mar. 18, 1982

[30] Foreign Application Priority Data

Mar. 23, 1981 [GB] United Kingdom ............... 8108547

[51] Int. Cl.³ ........................................... G09G 1/00
[52] U.S. Cl. .................................. 340/709; 340/710; 340/724
[58] Field of Search ............... 340/709, 710, 706, 724, 340/870.34, 347 SY; 318/605, 608, 661

[56] References Cited

U.S. PATENT DOCUMENTS 3,667,031  5/1972  Cox, Jr. et al. ............... 340/870.34
3,863,098  1/1975  Mehr ............................... 340/724
4,010,463  3/1977  Kay ................................. 318/661
4,020,391  4/1977  Baxter ............................ 340/709
4,079,374  3/1978  Cox, Jr. ...................... 340/347 SY
4,148,014  4/1979  Burson ........................... 340/709

Primary Examiner—Gerald L. Brigance
Attorney, Agent, or Firm—Kerkam, Stowell, Kondracki & Clarke

[57] ABSTRACT

A control system for positioning a marker on a cathode-ray tube display (18) includes position registers (16) operable to store the position of the marker on the screen. Input means (11) generate signals which represent desired changes in the position of the marker. Comparison means (15) response to these signals to produce an output pulse corresponding to each increment of change in the position of the marker. Control means (14) control the operation of the comparison means. Frequency-sensitive means (17) are provided to control the rate at which pulses are applied to the position registers (16).

17 Claims, 3 Drawing Figures

CONTROL SYSTEM FOR POSITIONING A MARKER ON A CATHODE-RAY TUBE DISPLAY

Markers are commonly used on cathode-ray tube displays in order to indicate a particular feature of the display. Since the marker requires to be moved in two dimensions, so far as the display is concerned, control may be exerted by two potentiometers, one rotating the marker in each coordinate direction. The two potentiometers may be coupled by a so-called "tracker ball", in which a rotatable sphere drives the two potentiometers through friction drives from the surface of the sphere. Such a control is easily operated by a user.

Marker position control systems frequently have other inputs, enabling a marker to be moved by other input sources. However, a possible problem arises if potentiometers are used, since these have definite end-stops beyond which further movement is not possible. It is therefore possible to reach a situation where desired movement of a marker cannot be achieved.

It is an object of the present invention to provide a marker position control system in which infinite movement of the control is possible.

According to the present invention there is provided a control system for positioning a marker on a cathode-ray tube display, which includes one or more position registers operable to store a number identifying the position of the marker on the display, input means for generating a signal representing a desired change in the position of the marker, comparison means responsive to said signal to produce an output pulse corresponding to each increment of change in the position of the marker, control means for controlling the operation of the comparison means and frequency-sensitive means responsive to the rate of occurrence of the said output pulses to control the rate at which said output pulses are applied to the or each register to change the number stored therein.

An embodiment of the invention will now be described with reference to the accompanying drawings, in which.

Marker positioning systems may use a variety of different input devices. Frequently the two coordinates of the marker position are controlled by a single device known as a "tracker ball", which is a sphere coupled by fiction drives to two transducers. The transducers may be potentiometers, but these have limited movement, and are not always suitable. The present invention uses a pair of synchro resolvers as the transducers.

Figure 1:
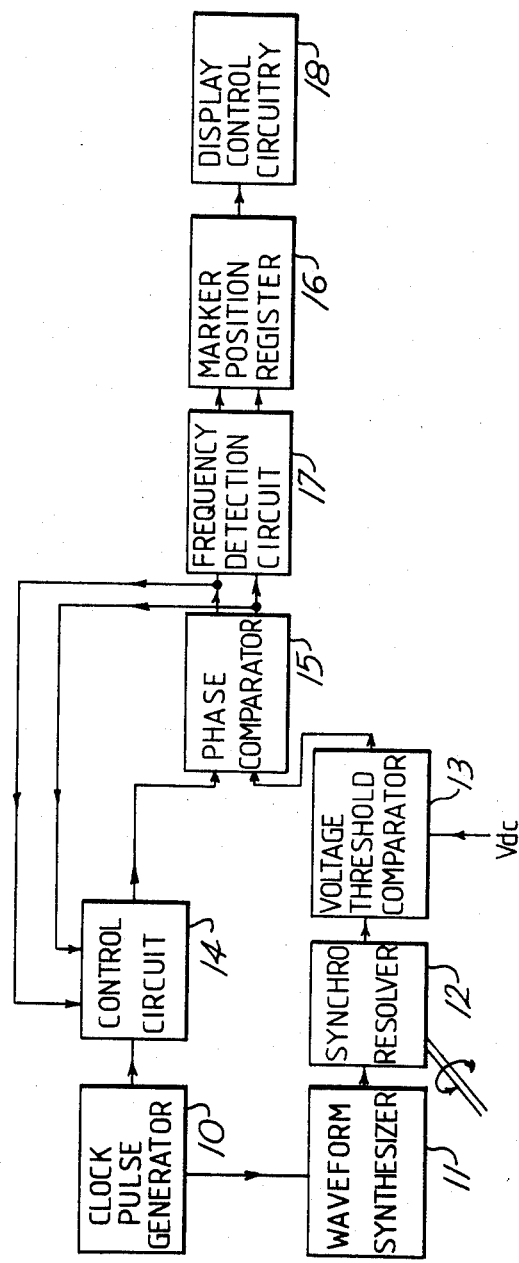
FIG. 1 is a block diagram of a control system operating on a single axis.

Referring now to FIG. 1, this shows, in schematic form, a block diagram of the system. A clock pulse generator 10 is provided to supply the necessary pulse trains. Since resolvers are used, it is necessary to derive from the clock pulse generator output sine and cosine waveforms at a suitable frequency. These two waveforms are produced from the clock output by the synthesiser 11 and are applied to the two rotor windings of each synchro resolver, indicated at 12. The output obtained from the stator of resolver is a sinusoidal wave form, and the phase of this wave form relative to that applied to one of the rotor windings depends upon the angular position of the rotor relative to the stator. The waveforms may have a frequency of, say, 2 KHz.

The output of each resolver is applied to a comparator 13 having a small d.c. offset to avoid jitter, and the output of these comparators are of rectangular waveforms with an uneven mark-to-space ratio. The resolvers and the comparator 13 form the input means of the invention.

A further output from the clock generator 10 is applied through a control circuit 14, the function of which will be described in detail later and forming the control means of the invention. The output from this circuit 14 is of rectangular waveform with a frequency of 2 KHz, that is the same as the frequency of the comparator 13 outputs.

The two 2 KHz outputs are applied to a phase comparator 15, the comparison means of the invention. This compares the phase of the two input waveforms, and adjusts the input from the control circuit until the two are in synchronism. The amount of adjustment required is an indication of the phase difference, and hence of the rotation of the rotor of either resolver. This output, for each resolver, could be applied directly to the marker position register 16, which stores the two coordinates of the marker position. However, the diagram shown in FIG. 1 has a frequency detection circuit 14 included between the phase comparator 15 and the resistor 16. This frequency detector is arranged to vary the rate at which the contents of the register are changed in accordance with the rate of rotation of a resolver rotor, above a predetermined threshold rate. The frequency detector forms the frequency-sensitive means of the invention.

The outputs from the marker position register are applied to the display control circuitry 18.

It must be remembered that the two outputs from the tracker ball are kept separate, and each affects a separate register.

Figure 2:
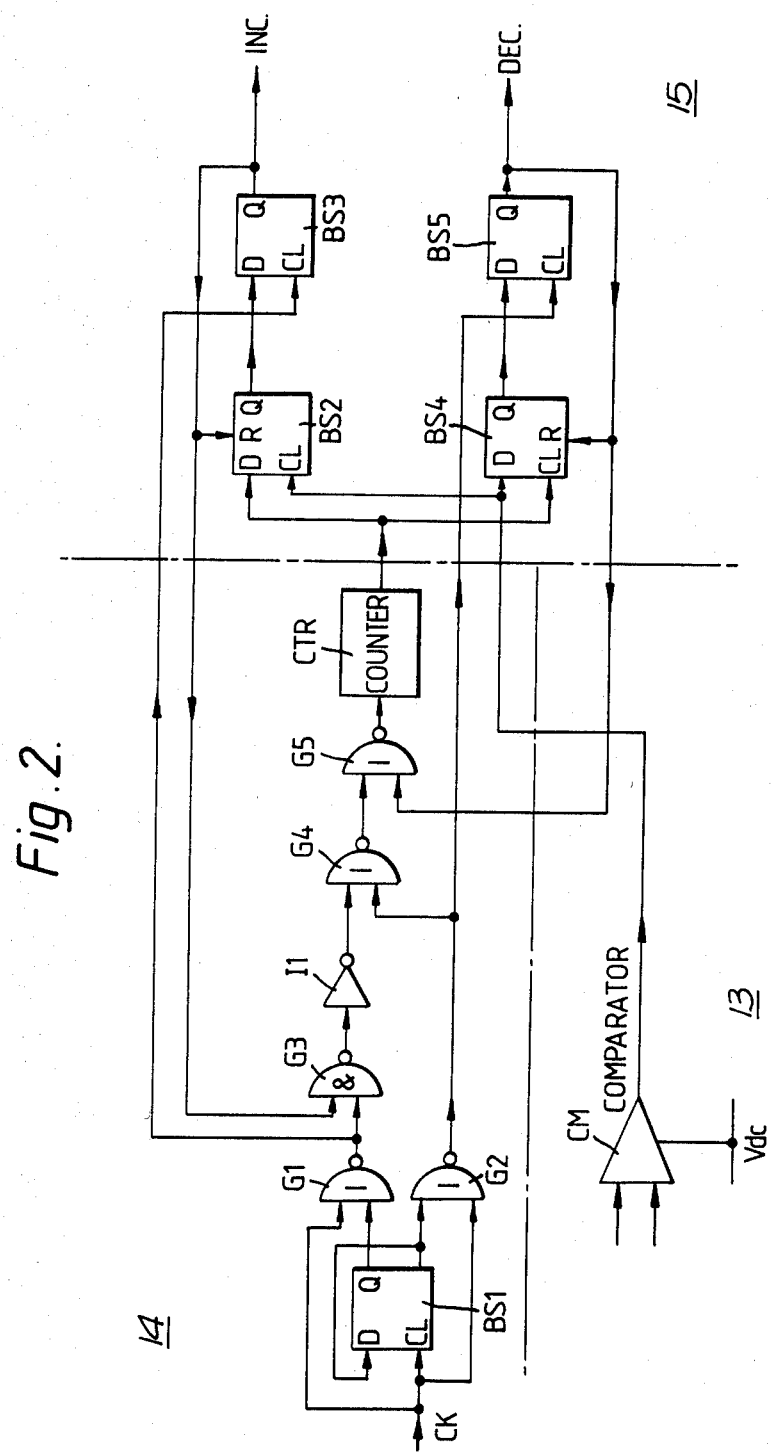
FIG. 2 is a logic diagram of the comparison means of the invention.

Some of the blocks of FIG. 1 will now be described in more detail. FIG. 2 shows the control circuit 14, comparator 13 and phase comparator 15 in logic form, and is concerned with one "channel" only, that is the output of one of the resolvers. The other channel will be identical, except for part of the control circuit which is common.

Referring now to FIG. 2, the output CK from the clock pulse generator 10 of FIG. 1 is applied to the clock input (CL) of a D-type bistable circuit BS1. The Q output is connected to one input of a NOR gate G1, whilst the other input of the gate is connected to the clock pulse input. The other output of the bistable circuit is connected to the data (D) input of the bistable circuit and to one input of a second NOR gate G2. The other input of this gate is also connected to the clock pulse input. The output of gate G1 is connected to one input of a NAND gate G3, the output of which is connected through an invertor I to one input of gate G4. The other input of gate G4 is connected to the output of gate G2. The output of gate G4 is connected to one input of NOR gate G5, the output of which is connected to the clock input of a 12-bit counter CTR. The output of this counter forms the output of the control circuit 14 of FIG. 1.

The comparator 13 of FIG. 1 is shown in FIG. 2 as an operational amplifier having a dc offset voltage Vdc applied to it.

The remaining part of FIG. 2 shows the phase comparator of FIG. 1. This is a circuit to which are applied the outputs of the control circuit and of the comparator 13. As will be seen from FIG. 2, the phase comparator comprises two pairs of bistable circuits. The output of the counter CTR is connected to the data input of bistable circuit BS2 and to the clock input of bistable circuit BS3. The output of the comparator 13 is connected to the clock input of bistable circuit BS2 and to the data input of bistable circuit BS3. The Q output of bistable circuit BS2 is connected to the data input of a further bistable circuit BS4, which has the output of NOR gate G1 applied to its clock input. The Q output of bistable circuit BS4 forms one output of the phase comparator and is also connected to the other input of NAND gate G3 and to the reset (R) input of bistable circuit BS2.

The Q output of bistable circuit BS3 is connected to the data input of a further bistable circuit BS5, which has the output of NOR gate G2 connected to its clock input. The Q output of bistable circuit BS5 forms the other output of the phase comparator, and is also connected to the other input of NOR gate G5 and to the reset (R) input of bistable circuit BS4.

In operation a clock pulse waveform at a frequency of, say, 1024 KHz is applied to the clock input of bistable circuit BS1. The arrangement of the circuit is such that gate G1 delivers a pulse train at a frequency of 512 KHz, whilst the output of gate G2 is a pulse train of the same frequency but 180° out of phase. The 12-bit counter CTR divides-down the pulse input to it to deliver a 2 KHz rectangular waveform. The purpose of the remainder of the circuitry of FIG. 2, apart from the resolver signal input and comparator CM, is to provide a phase-locked loop arranged to vary the phase of the output of the control circuit so that it is in synchronism with the output of the comparator CM. If, for example, the pulse output from the counter CTR leads on the pulse output from the comparator CM, then an output is obtained from bistable circuit BS3. This applies an input to gate G3 which results in the blocking of an input pulse to the counter and hence a shortening of the counter output pulse. This is repeated until the counter output and the comparator output are in phase. Similarly, if the comparator output leads on the counter output, an output is obtained from bistable circuit BS5. This applies an input to gate G5, and causes an additional input pulse to be applied to the counter to lengthen the counter output pulse.

As the phase of the comparator output varies, due to rotation of the resolver, so the phase-locked loop will generate "increase" pulses from bistable circuit BS3 or "decrease" pulses from bistable circuit BS5, depending upon the direction of rotation of the resolver. The total number of pulses generated will indicate the extent of such rotation, whilst the rate at which the pulses occur will indicate the rate of rotation of the resolver. These pulses could be applied to the marker position register 16 of FIG. 1, by way of a pulse synchronising circuit to ensure that pulses are applied to the register only when clock pulses occur, to prevent pulses being lost.

Figure 3:
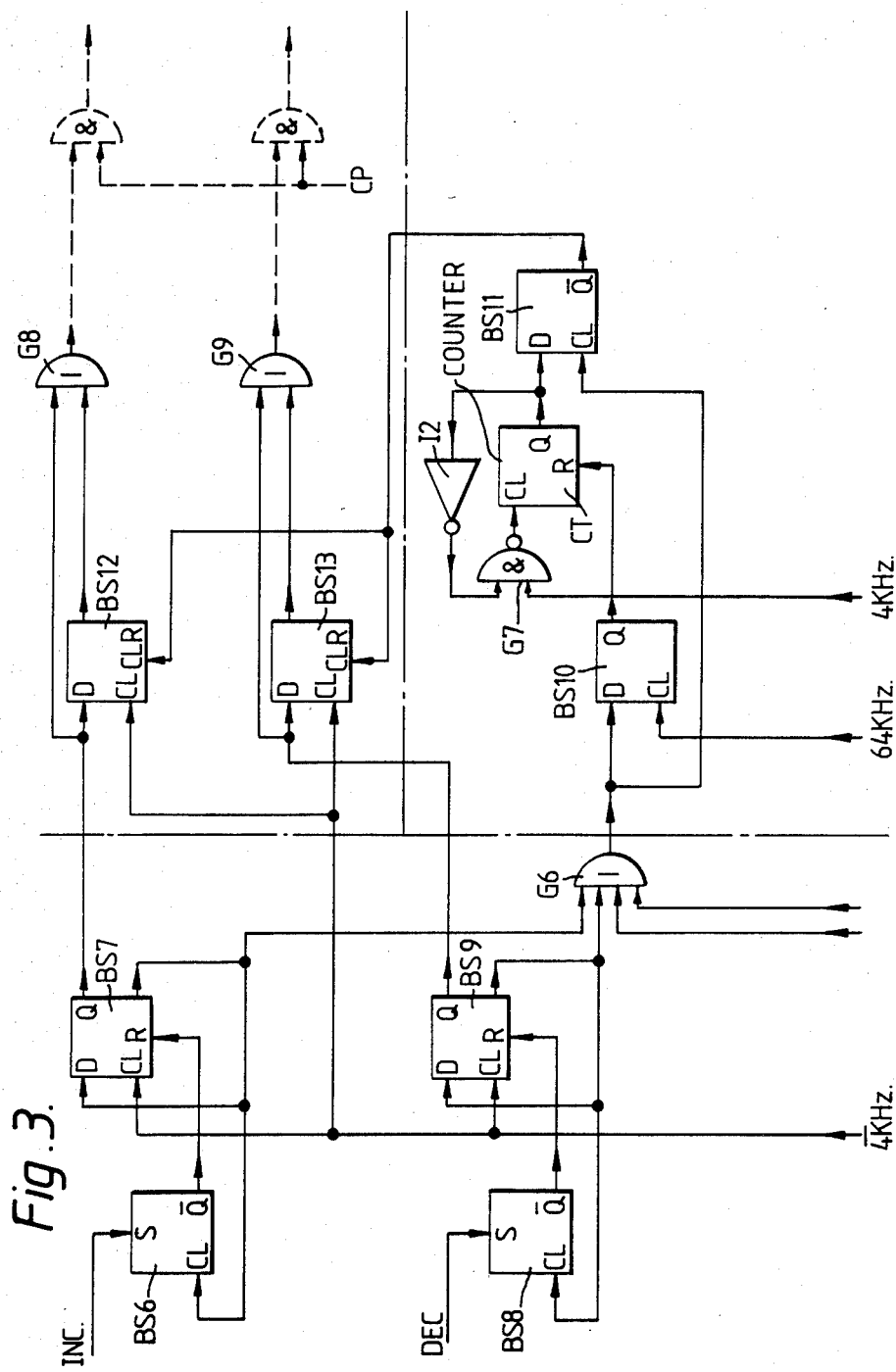
FIG. 3 is a logic diagram of the frequency-sensitive means of the invention.

The arrangement shown in FIG. 3 illustrates the synchronising circuit and also some extra circuitry, the function of which will be described.

The synchronising circuit comprises a pair of bistable circuits BS6 and BS7 for the "increase" pulse line, and a further pair of bistable circuits BS8 and BS9 for the "decrease" pulse line, each pair being connected in a similar manner. For example, the "increase" ouput from bistable circuit BS5 of FIG. 2 is connected to the "set" input of the circuit BS6. The inverted output of the circuit is connected to the "reset" input of bistable circuit BS7. The "clock" input of circuit BS7 is connected to a 4 KHz clock pulse. The inverted output of bistable circuit BS7 is connected to the "data" input of circuit BS7 and to the "clock" input of circuit BS6.

The other pair of bistable circuit, BS8 and BS9 are connected in the same way, with the "decrease" output from bistable circuit BS3 of FIG. 2. The inverted outputs of each of the bistable circuits BS7 and BS9 form two inputs of a four-input OR gate G6, the other two inputs being derived from the azimuth channel.

The remainder of FIG. 3 may be divided into two parts. The output of gate G6 passes to a frequency detector circuit which determines whether the rate at which the "increase" or "decrease" pulses occur exceeds a predetermined threshold rate. The output of gate G6 is applied to the "data" input of a bistable circuit BS10 having a high frequency clock pulse input of, say, 64 KHz. The output is connected to the "reset" input of a 12-bit counter CT. The output of this circuit is applied through an invertor I2 to one input of a two-input NAND gate G7. The other input of the gate is provided by a 4 KHz pulse train 180° out of phase with that applied to bistable circuits BS7 and BS9. The output of gate G7 is applied to the "clock" input of counter CT. The output of counter CT is also applied to the "data" input of bistable circuit BS11 the "clock" input of which is provided by the output of gate G6.

The output of each synchronising circuit is applied to a pulse doubler circuit. For example, the output of bistable circuit BS7 is connected to the "data" input of a bistable circuit BS12, having the output of circuit BS11 connected to its "reset" input and its "clock" input connected to the same 4 KHz clock pulse source as are bistable circuits BS7 and BS9.

The output of circuit BS12 is connected to one input of OR gate G8, the other input of which is connected to the "data" input of circuit BS12. The output of gate G8 is the "Range increase" pulse output to the Range register of FIG. 1.

The output of bistable circuit BS9 is similarly connected to a pulse doubling circuit comprising a bistable circuit BS13 and an OR gate G9. The output of gate G9 is the "Range decrease" pulse output to the Range register.

The operation of the circuit of FIG. 3 is as follows:

The pulse synchronising circuit receives a short pulse which is a demand for an increase or a decrease from the phase-locked loop. This sets the bistable circuit (BS6 or BS8). The ouput of this bistable circuit sets the next bistable circuit (BS7 or BS9) in synchronism with the 4 KHz pulse which is synchronised with the operation of the remainder of the circuit.

Pulses from all the channels are applied to gate G6, the ouput of which is applied to the frequency detector.

In the absence of an output from gate G6, 4 KHz pulses applied to gate G7 clock the counter CT up to a maximum count of 256. The resulting output, via invertor I2, blocks gate G7 and prevents further 4 KHz clock pulses from being applied to the counter CT. The absence of an ouput from bistable circuit BS11, since no clock input is present, prevents circuits BS12 and BS13 from being cleared.

When a pulse is provided by gate G6, due say to an input from circuit BS7, this has the effect of changing the state of bistable circuit BS10 and clearing the counter CT. At the same time, the output of circuit BS7 causes an input to be applied to gate G8, and hence to the following circuitry. At the same time circuit BS12 is set and applies another input to gate G8. The counter CT starts to count again, and if no more input pulses are applied to gate G6 the counter CT reaches its maximum count and locks out, as before. the resulting output from circuit BS11 clears the bistable circuit BS12 and thus terminates the input to gate G8. Hence the length of the output pulse from gate G8 depends upon the counter CT reaching its maximum count.

If pulses are applied to gate G6 before the counter reaches its maximum count, then it is reset via circuit from circuit BS11. Bistable circuit BS12 is therefore not reset, and continues to apply an input to gate G8.

It will be seen, therefore, that the length of the output pulse from gate G8 is greater when counter CT is continually being reset before reaching its maximum count than when the counter is not being reset. Thus when the rate of application of pulses to gate G6 is low, the output pulse from gate G8 is relatively short, and when the rate of application of pulses to gate G6 is high, the output pulse from gate G8 is relatively long. The same applies to outputs obtained via bistable circuit BS13 and gate G9.

The threshold pulse rate is determined by the size of counter CT and its clock pulse frequency, and may therefore be varied.

The output from gate G8 or G9 may conveniently be used to "enable" the application of clock pulses to the appropriate position register, for example as shown in broken line in FIG. 3. Hence a long pulse allows more clock pulses to be applied to the register than does a short pulse.

It will be understood that the logic circuits described are only by way of example, and that they may be realised in many different forms.

What we claim is:

1. A control system for positioning a marker on a cathode-ray display, said system comprising:
   at least one position register operable to store a number identifying the position of the marker on the display;
   at least one synchro resolver having rotor and stator elements, a pair of input windings on one of said rotor and stator elements and an output winding on the other of said rotor and stator elements;
   means for applying a sinewave energising signal to one of said pair of input windings and a cosinewave energising signal to the other of said pair of input windings such that the output winding delivers a signal having a sinusoidal waveform differing in phase from one of the energising signals by an extent dependent upon the angular position of said rotor relative to said stator;
   circuitry responsive to the output winding signal for producing an output pulse corresponding to each predetermined increment of rotation of said rotor; and
   circuitry for changing the number stored in said position register as a function of the output pulses.

2. A control system as claimed in claim 1, wherein said circuitry from changing the number stored in said position register comprises a frequency-sensitive means responsive to the rate of occurrence of the output pulses to control the rate at which the number stored in said position register is changed.

3. A control system as claimed in claim 2 which further comprises means for converting the sinusoidal waveform output of said output winding into a first rectangular waveform.

4. A control system as claimed in claim 3, wherein the first rectangular waveform is of uneven mark-space ratio.

5. A control system as claimed in claim 3, wherein said circuitry responsive to the output winding signal for producing an output pulse for each increment of rotation of said rotor comprises a phase-locked loop including:
   circuitry for generating a second rectangular waveform of variable mark-space ratio;
   a phase comparator operable to compare the phase of the first rectangular waveform with the phase of the second rectangular waveform to provide phase comparator output pulses consitituting the output pulses corresponding to each increment of rotor rotation; and
   control means responsive to the phase comparator output pulses for adjusting the phase of the second rectangular waveform to correspond to the phase of the first rectangular waveform.

6. A control system as claimed in claim 5, wherein said frequency-sensitive means comprises:
   a frequency detector for determining whether the rate at which the successive output pulses corresponding to each increment of rotor rotation occur exceeds a predetermined threshold rate and providing an output indicative thereof; and
   pulse control circuitry responsive to the output pulses corresponding to each increment of rotor rotation and responsive to said frequency detector output and operative to supply a relatively higher number of clock pulses to said position register for each successive output pulse when the threshold is exceeded, and to supply a relatively lower number of clock pulses to said position register for each successive output pulse when the threshold is not exceeded.

7. A control system as claimed in claim 6, wherein said frequency detector includes:
   a counter having a maximum count value and connected to be clocked by a clock pulse train and to be reset by each successive output pulse corresponding to each increment of rotor rotation; and
   circuitry for providing an output only when said counter is able to count up to its maximum value between successive output pulses corresponding to each increment of rotor rotation.

8. A control system as claimed in claim 7, wherein said pulse control circuitry operates in the absence of an output from the counter to supply the relatively higher number of clock pulses to said position register.

9. A control system as claimed in claim 3, wherein said frequency-sensitive means comprises:
   a frequency detector for determining whether the rate at which the successive output pulses corresponding to each increment of rotor rotation occur exceeds a predetermined threshold rate and providing an output indicative thereof; and
   pulse control circuitry responsive to the output pulses corresponding to each increment of rotor rotation and responsive to said frequency detector output and operative to supply a relatively higher number of clock pulses to said position register for each successive output pulse when the threshold is exceeded, and to supply a relatively lower number of clock pulses to said position register for each successive output pulse when the threshold is not exceeded.

10. A control system as claimed in claim 9, wherein said frequency detector includes:
  a counter having a maximum count value and connected to be clocked by a clock pulse train and to be reset by each successive output pulse corresponding to each increment of rotor rotation; and
  circuitry for providing an output only when said counter is able to count up to its maximum value between successive output pulses corresponding to each increment of rotor rotation.

11. A control system as claimed in claim 10, wherein said pulse control circuitry operates in the absence of an output from the counter to supply the relatively higher number of clock pulses to said position register.

12. A control system as claimed in claim 2, wherein said frequency-sensitive means comprises:
  a frequency detector for determining whether the rate at which the successive output pulses corresponding to each increment of rotor rotation occur exceeds a predetermined threshold rate and providing an output indicative thereof; and
  pulse control circuitry responsive to the output pulses corresponding to each increment of rotor rotation and responsive to said frequency detector output and operative to supply a relatively higher number of clock pulses to said position register for each successive output pulse when the threshold is exceeded, and to supply a relatively lower number of clock pulses to said position register for each successive output pulse when the threshold is not exceeded.

13. A control system as claimed in claim 12, wherein said frequency detector includes:
  a counter having a maximum count value and connected to be clocked by a clock pulse train and to be reset by each successive output pulse corresponding to each increment of rotor rotation; and
  circuitry for providing an output only when said counter is able to count up to its maximum value between successive output pulses corresponding to each increment of rotor rotation.

14. A control system as claimed in claim 13, wherein said pulse control circuitry operates in the absence of an output from the counter to supply the relatively higher number of clock pulses to said position register.

15. A control system as claimed in claim 1 which further comprises means for converting the sinusoidal waveform output of said output winding into a first rectangular waveform.

16. A control system as claimed in claim 15, wherein the first rectangular waveform is of uneven mark-space ratio.

17. A control system as claimed in claim 15, wherein said circuitry responsive to the output winding signal for producing an output pulse for each increment of rotation of said rotor comprises a phase-locked loop including:
  circuitry for generating a second rectangular waveform of variable mark-space ratio;
  a phase comparator operable to compare the phase of the first rectangular waveform with the phase of the second rectangular waveform to provide phase comparator output pulses constituting the output pulses corresponding to each increment of rotor rotation; and
  control means responsive to the phase comparator output pulses for adjusting the phase of the second rectangular waveform to correspond to the phase of the first rectangular waveform.

* * * * *